Figure 1:
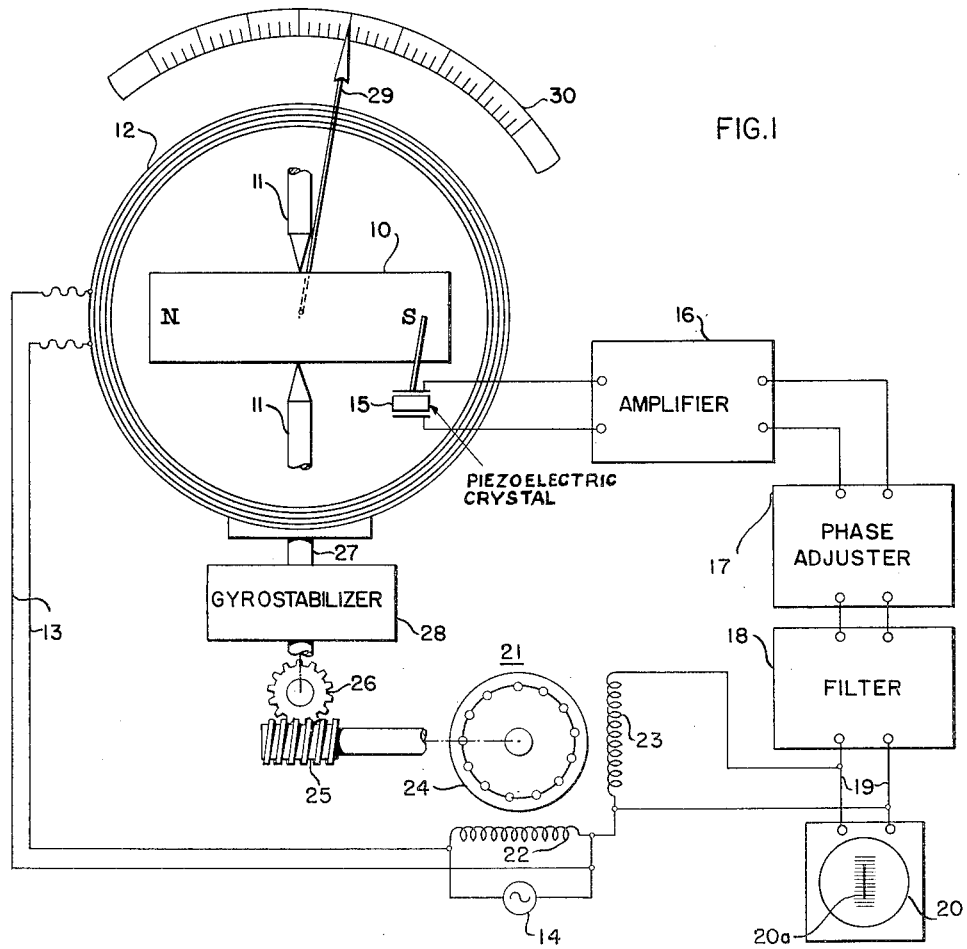

Oct. 12, 1943.  D. W. MOORE, JR  2,331,617

MAGNETIC FIELD RESPONSIVE DEVICE

Filed March 31, 1942

INVENTOR
DAVID W. MOORE JR.
BY Lawrence B. Dodds
ATTORNEY

Patented Oct. 12, 1943

2,331,617

UNITED STATES PATENT OFFICE 2,331,617

MAGNETIC FIELD RESPONSIVE DEVICE

David W. Moore, Jr., New York, N. Y., assignor to Fairchild Aviation Corporation, a corporation of New York Application March 31, 1942, Serial No. 436,941

16 Claims. (Cl. 33—204)

This invention relates to magnetic field responsive devices and, while it is of general application, it is particularly suitable for use in earth inductor compasses, that is, devices giving an electrical indication of deviation from the north-south earth's magnetic field.

Heretofore there have been devised numerous earth inductor compasses of the type embodying a magnetic field responsive device, perhaps the most common of which comprises a miniature synchronous generator excited by the earth's magnetic field. Such a device has the disadvantages that it requires an auxiliary power driving device, such as a pneumatic motor for driving the generator; that it has a relatively large number of moving parts operating at high speeds; and that it is complex and costly. At the same time, due to the weak intensity of the earth's magnetic field, the devices of the prior art have not been capable of delivering any appreciable amount of electric power output for indicating and control purposes, as is often desired.

It is an object of this invention to provide a new and improved magnetic field responsive device which is particularly suitable for use in earth inductor compasses and which avoids one or more of the above-mentioned disadvantages of prior art arrangements and which is particularly capable of delivering appreciable amounts of power output for indicating and control purposes.

In accordance with the invention, a magnetic field responsive device comprises an exciting coil means, a periodic wave supply circuit for the coil means, and a pivoted magnetic armature disposed within the field of the coil means. Preferably, the armature is pivoted about an axis normal to the axis of the coil means and has a magnetic axis normally in a predetermined angular relation to the magnetic axis of the coil means. The armature is balanced in the field of the coil means in the absence of an external magnetic field, but is subject to vibration in the presence of an external magnetic field having a component in a plane normal to the pivotal axis of the armature with an angular relation to the axis of the armature differing substantially from said predetermined relation. There are also provided means responsive to the vibration of the armature for giving an indication of the external magnetic field. In a preferred embodiment of the invention, this last-named means comprises a piezoelectric crystal connected to the armature and, through a suitable amplifier, to an exciting element of a phase-responsive device, which, in turn, is connected to adjust the armature to a position with its axis in the predetermined relation to the external field, thereby to indicate its direction.

For a better understanding of the invention, together with other and further objects thereof, reference is made to the following description taken in connection with the accompanying drawing and its scope will be pointed out in the appended claims.

Figure 2:
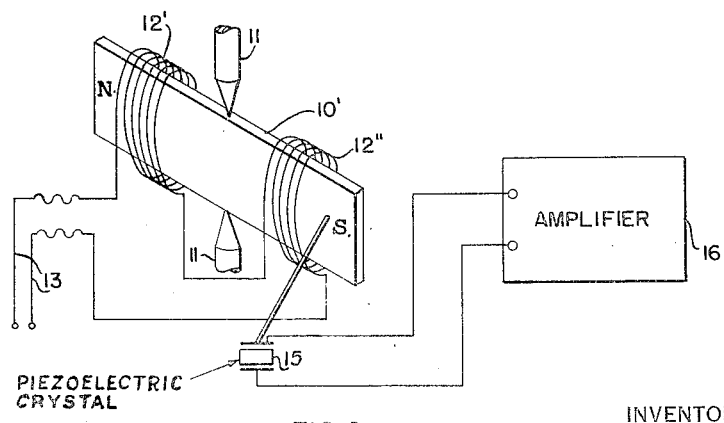

In the drawing, Fig. 1 is a diagram, partly schematic, of an earth inductor compass embodying the improved magnetic field responsive device of the invention, while Fig. 2 is an illustration of a modified form of the magnetic field responsive device of Fig. 1, per se.

Referring to Fig. 1 of the drawing, the magnetic field responsive device there represented comprises a magnetic armature 10 in the form of a flat elongated vane pivoted about its transverse axis of symmetry by means of pivots 11, 11. The armature 10 is of high permeability material such as an alloy commercially available as "Permalloy" and is centrally disposed within, and in the plane of, a large exciting coil means 12, in this instance a single concentrated winding. The pivotal axis of the armature 10 is preferably normal to the axis of the coil means 12 and its magnetic axis is also preferably normal to that of coil means 12 so that the armature is balanced in the field of the coil means in the absence of an external magnetic field. The pivots 11, 11 are fixedly supported from coil structure 12. The winding 12 is connected to an alternating current supply circuit 13 which, in turn, may be connected to a suitable periodic wave supply circuit such as an alternating current source 14 of relatively high frequency such as may be furnished by a vacuum tube oscillator. As thus disposed, the armature 10 is balanced in the field of the coil means 12 in the absence of an external magnetic field. One end of the armature 10 is connected to a piezoelectric crystal 15 mounted rigidly with respect to the coil means 12. That is, the armature 10, the coil means 12, and the crystal 15 form a unitary structure which is rigid except for the very small amplitude restrained oscillations of armature 10 about its pivots 11, 11. The mass of the armature 10 is preferably so proportioned relative to the resilience of the crystal 15 that their natural frequency of mechanical vibration is substantially equal to that of alternating current circuit 13 and source 14, for example, a frequency of the order of 400 cycles. The electrodes of crystal 15 are connected to the input circuit of an amplifier 16 of one or more stages which, in turn, is connected through a phase adjuster 17 and a filter 18 to the output or indicating circuit 19. The frequency of circuit 13 is preferably high relative to that of any spurious vibration to which the crystal 15 may be subject in operation and the filter 18 is a high-pass filter for passing the desired oscillations generated by crystal 15, while suppressing those due to spurious vibrations.

The device also includes means responsive to the vibration of the armature for giving an indication of an external magnetic field; for example, an indicating device, such as a cathode-ray tube 20, may be connected to the circuit 19 to give, by virtue of a suitable scale 20a thereon, a direct indication of the amplitude of the oscillations developed by crystal 15 and of the signal output of the system. In addition, the output of the system responsive to the vibration of armature 10 may be used for automatically adjusting the coil means 12, the associated crystal 15, and armature 10 from any given position to their position of equilibrium and thus give an indication of the presence of an external field. In this case there may be provided a phase-responsive device, such as a two-phase motor 21, having a winding 22 connected directly to the source 14, a winding 23 connected to the output circuit 19, and an armature 24 connected through suitable gearing, such as the worm 25 and worm wheel 26, to the pivoted shaft 27 supporting the magnetic field responsive device, per se. As explained more fully hereinafter, the magnetic field responsive device as embodied in an earth inductor compass will give a true indication of the deviation from magnetic north-south only when it is stabilized with its axis of rotation normal to the horizontal plane. To this end there may be provided a gyrostabilizer 28 for maintaining the axis of rotation of the magnetic field responsive device normal to the horizontal plane. If desired a pointer 29 may be attached to armature 10 and cooperate with a stationary scale 30 to indicate the deviation of the vehicle carrying the compass from magnetic north-south.

In explaining the operation of the magnetic field responsive device described, it will be assumed that initially the device is so disposed that the armature 10 is horizontal and normal to the horizontal component of the earth's magnetic field. Under these conditions the armature 10 is not magnetized along its axis and, since it is centered in the field of the winding 12 with its magnetic axis normal to the magnetic axis of winding 12, it is balanced in such field and the field does not exert any torsional effect on the armature 10 about its pivots 11, 11 so that it does not vibrate. Consequently, no voltage is developed at the output electrodes of the crystal 15 and applied through the units 16, 17, and 18 to the winding 23 of motor 21 so that the motor does not operate.

If now the support on which the earth inductor compass is mounted, such as any mobile vehicle, changes its course, the armature 10 will no longer be normal to the horizontal component of the earth's magnetic field so that that component will tend to magnetize the armature 10 with its opposite ends polarized north and south, as indicated by "N" and "S" in the drawing. Under these conditions, the magnetic field of the armature 10 forms a magnetic couple with the alternating field of the winding 12 and causes a torsional vibration of the armature 10 about its pivots 11, 11 at the frequency of the supply source 14. Consequently, a piezoelectric voltage of the same frequency is generated at the electrodes of the crystal 15 and applied to the amplifier 16 for suitable amplification. The amplified output of crystal 15 is applied through units 17 and 18 to the winding 23 of the motor 21 and the phase adjuster 17 is so adjusted that, under these conditions, the voltages impressed upon the windings 22 and 24 are in quadrature so that the motor is excited for normal operation. The motor 21 through the gearing 25, 26 adjusts the magnetic field responsive device until the armature 10 is again disposed with its longitudinal axis normal to the horizontal component of the earth's magnetic field, at which time the motor 21 is again de-energized and the system is in equilibrium. At the same time, the pointer 29 and associated scale 30 give an indication of the deviation of the course of the vehicle from magnetic north-south.

On the other hand, in case the vehicle on which the apparatus is mounted should deviate in the opposite direction from magnetic north-south, the horizontal component of the earth's magnetic field would magnetize the armature 10 with opposite polarity so that the magnetic couple between it and the field of the winding 12 would be reversed in phase. Consequently, the voltage developed by the crystal 15 and applied through the units 16, 17, and 18 to the winding 23 of the motor 21 would also be of opposite polarity and the motor 21 would rotate in the opposite direction, again to restore the apparatus to a condition of equilibrium with the armature 10 normal to the horizontal component of the earth's magnetic field. The motor 21 thus comprises phase-responsive means responsive to the phase relation between the excitation of the supply circuit 13 and the oscillations developed by crystal 15.

It will be appreciated that, if desired, the adjusting mechanism for returning the magnetic field responsive device to its neutral position in the earth's magnetic field may be omitted and the magnitude of the output of the device measured directly on the scale 20a of the oscilloscope 20, the length of the trace on the oscilloscope being a measure of the deviation of the vehicle from magnetic north-south.

Thus, in one case, the trace on the oscilloscope 20 and, in the other case, the excitation and rotation of the motor 21 to restore the apparatus to its position of equilibrium give an indication of the presence of, or the magnitude and direction of the horizontal component of, the earth's magnetic field, or both. Therefore, this portion of the apparatus may be used generally to indicate the presence or the magnitude and direction, or both, of any external magnetic fields which it may be desired to measure.

As stated above, the mechanical system comprising the armature 10 and the piezoelectric crystal 15 are preferably designed to have a natural frequency of mechanical vibration substantially equal to that of the alternating current source 14. The advantage is primarily one of sensitivity since, under that condition, the amplitude of vibration of the armature 10 will be the greatest. However, in case these two frequencies are somewhat different, this difference does not introduce any error into the operation of the system but only reduces its sensitivity. In any event, the resilient characteristics of crystal 15 are such as to limit or restrain the vibration of the armature 10 to only a few millionths of an inch and at all times it is maintained substantially in the plane of the winding 12.

In case the earth inductor compass described assumes a position other than the horizontal, it might well be that it would either be in a position, or be adjusted to a position, in which the horizontal component of the earth's magnetic field magnetized the armature 10 equally and oppositely to the vertical component of the same field, in which case the apparatus would be adjusted to a false position of equilibrium in which the armature 10 was not normal to the horizontal component of the earth's magnetic field. Further, even though the apparatus did not reach equilibrium in this false position, the magnitude of the electrical output of the apparatus would no longer be proportional to the deviation of the compass from magnetic north-south, so that the indication of the oscilloscope 20 would be subject to a considerable error. This error is known as the "tilt" error and is common to earth inductor compasses. To avoid this trouble, there is provided the gyrostabilizer 28 effective to maintain the apparatus with the axis of rotation of the armature 10 normal to the horizontal plane.

The high-pass filter 18 is effective to pass the desired oscillations developed by the crystal 15 at the frequency of source 14 while suppressing interfering voltages generated by the crystal 15 due to spurious vibrations, such as engine vibrations, in case the compass is used on an aircraft or the like. These interference voltages unless suppressed would tend to affect and distort the indication of the oscilloscope 20. However, in case the oscilloscope 20 is omitted the filter 18 may also be omitted since the energy content of these spurious oscillations is generally small compared to that of the desired oscillations. Also, since they tend to become integrated by the motor winding 23, they do not appreciably affect its performance.

The magnetic field responsive device, per se, represented in Fig. 2, differs from that of Fig. 1 in that the armature or vane 10', which is similar to the armature 10 of Fig. 1, is allowed to orient itself parallel to the horizontal component of the earth's magnetic field rather than normal thereto as in Fig. 1. Also, in this instance, the coil means 12 of Fig. 1 is replaced by two concentrated windings 12' and 12'' symmetrically disposed on opposite sides of the pivots 11, 11 and closely surrounding the armature 10' so that the magnetic axis of the armature 10' is substantially coincident with that of the windings 12' and 12''. With this arrangement, the field of the coil means 12', 12'' normally magnetizes the armature 10' with alternating polarities so that, whenever the device is disposed with the armature 10' at an angle to the horizontal component of the earth's field, the armature 10' will form a magnetic couple with such field component and will vibrate torsionally at the frequency of the source 14 and generate an alternating voltage of the same frequency across the electrodes of the piezoelectric crystal 15.

In effect, in the arrangement of Fig. 2 the functions of the field of the coil means and of the earth's field are reversed with respect to their functions in the structure of Fig. 1; otherwise, a device of the type of Fig. 2 included in the system of Fig. 1 will operate therein substantially as described above with the exception that the apparatus will reach a position of equilibrium when the armature 10' is aligned with the horizontal component of the earth's magnetic field rather than being normal thereto as in the structure of Fig. 1. The device of Fig. 2 has an advantage over that of Fig. 1 in that similar performance may be procured by means of a structure of smaller size and weight.

In general then, in each of the modifications described above the magnetic armature has a magnetic axis normally in a predetermined angular relation to the magnetic axis of the coil means, this angular relation being 90 degrees in the structure of Fig. 1 and zero degrees in the structure of Fig. 2. Further, the armature in each instance is balanced in the field of the coil means in the absence of an external field, but is subject to vibration in the presence of an external field having a component with an angular relationship to the axis of the armature different than the above-named predetermined angular relationship. That is, the armature of the structure of Fig. 1 will vibrate when its magnetic axis is not normal to the horizontal component of the earth's magnetic field, in other words, whenever the angle between these two fields is other than 90 degrees; while in the structure of Fig. 2, the armature will vibrate whenever the magnetic axis of the armature 10' is not parallel with the horizontal component of the earth's magnetic field or, in other words, when its angular relationship is other than zero degrees.

There is thus provided in each of the modifications described, a magnetic field responsive device suitable for use in an earth inductor compass which has a minimum number of moving parts, none of which need operate at a high speed, and which is capable of supplying any desired amount of output power for indicating and controlling purposes, limited only by the amount of amplification provided by amplifier 16.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetic field responsive device comprising, exciting coil means, a periodic wave supply circuit for said coil means, a pivoted magnetic armature disposed within the field of said coil means, said armature being balanced in the field of said coil means in the absence of an external field but subject to vibration in the presence of an external field having a component in a plane normal to said pivotal axis, and means responsive to vibration of said armature for giving an indication of said external field.

2. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, and means responsive to vibration of said armature for giving an indication of said external field.

3. A magnetic field responsive device comprising, exciting coil means, a periodic wave supply circuit for said coil means, a magnetic armature pivoted about an axis normal to the magnetic axis of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, and means responsive to vibration of said armature for giving an indication of said external field.

4. A magnetic field responsive device comprising, exciting coil means, a periodic wave supply circuit for said means, a pivoted elongated high-permeability armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, and means responsive to vibration of said armature for giving an indication of said external field.

5. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, resilient restraining means for limiting the amplitude of vibration of said armature, and means responsive to vibration of said armature for giving an indication of said external field.

6. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, resilient restraining means for limiting the amplitude of vibration of said armature, said armature and said resilient means having a natural frequency of mechanical vibration substantially equal to that of said alternating current circuit, and means responsive to vibration of said armature for giving an indication of said external field.

7. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, means for developing electric oscillations from mechanical vibrations of said armature, and means for utilizing said oscillations for giving an indication of said external field.

8. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to the pivotal axis of said armature with an angular relation to the axis of said armature differing substantially from said predetermined relation, and means responsive to vibration of said armature in the presence of said external field for adjusting said armature and coil means to a position with the axis of said armature in said predetermined relation to said external field, thereby to indicate the direction of said external field.

9. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, means for developing electric oscillations from mechanical vibrations of said armature in the presence of said external field, and phase-responsive means responsive to the phase relation between the excitation of said supply circuit and said oscillations for adjusting said armature and coil means to a position with the axis of said armature in said predetermined relation to said external field, thereby to indicate the direction of said external field.

10. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, a piezoelectric device supported by said coil means and connected to said armature for vibration thereby, and means responsive to the output of said piezoelectric device for giving an indication of said external field.

11. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, a piezoelectric device supported by said coil means and connected to said armature for vibration thereby, and phase-responsive means responsive jointly to the output of said device and the excitation of said circuit for adjusting said armature and coil means to a position with the axis of said armature in said predetermined relation to said external field, thereby to indicate the direction of said external field.

12. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, a piezoelectric device supported by said coil means and connected to said armature for vibration thereby, and a two-phase motor connected to adjust said armature and coil means and having one phase winding coupled to said device and one phase winding connected to said circuit, thereby to adjust said armature to indicate the direction of said external field.

13. A magnetic field responsive device comprising, an exciting coil, a periodic wave supply circuit for said coil, a pivoted elongated magnetic armature centered within said coil with its axis normal to the axis of the coil, said armature being balanced in the field of said coil in the absence of an external field but subject to vibration in the presence of an external field having a component parallel to the axis of said armature, and means responsive to vibration of said armature for giving an indication of said external field.

14. A magnetic field responsive device comprising, exciting coil means, a periodic wave supply circuit for said coil means, a pivoted magnetic armature disposed within the field of said coil means and having a magnetic axis normally in a predetermined angular relation to the magnetic axis of said coil means, said armature being balanced in the field of said coil means in the absence of an external field but subject to vibration in the presence of an external field having a component in a plane normal to said pivotal axis with an angular relation to the axis of said armature differing substantially from said predetermined relation, a piezoelectric device connected to said armature for vibration thereby, the frequency of said alternating current circuit being high relative to that of any spurious vibration to which said piezoelectric device may be subject, a high-pass filter coupled to said piezoelectric device for passing only the oscillations developed thereby, and means responsive to the output of said filter for giving an indication of said external field.

15. A magnetic field responsive device comprising, an elongated magnetic armature pivoted about an axis normal to its magnetic axis, a pair of exciting coils surrounding said armature and symmetrically disposed on opposite sides of its pivotal axis with their magnetic axes normally substantially coincident with said armature magnetic axis, an alternating current supply circuit for said coils, said armature being balanced in the field of said coil in the absence of an external field but subject to vibration in the presence of an external field having a component normal to the axis of said armature, and means responsive to vibration of said armature for giving an indication of said external field.

16. In an earth inductor compass, a magnetic field responsive device comprising, exciting coil means, an alternating current supply circuit for said coil means, a pivoted magnetic armature disposed within the field of said coil means and having a magnetic axis normally in a predetermined angular relation to the magnetic axis of said coil means, said armature being balanced in the field of said coil means in the absence of the earth's magnetic field but subject to vibration when the horizontal component of the earth's magnetic field has an angular relation to the axis of said armature differing substantially from said predetermined relation, and means responsive to vibration of said armature by said component of the earth's magnetic field for adjusting said armature and coil means to a position with the axis of said armature in said predetermined relation to said earth's magnetic field, thereby to indicate the direction of said field.

DAVID W. MOORE, Jr.